Figure 1:
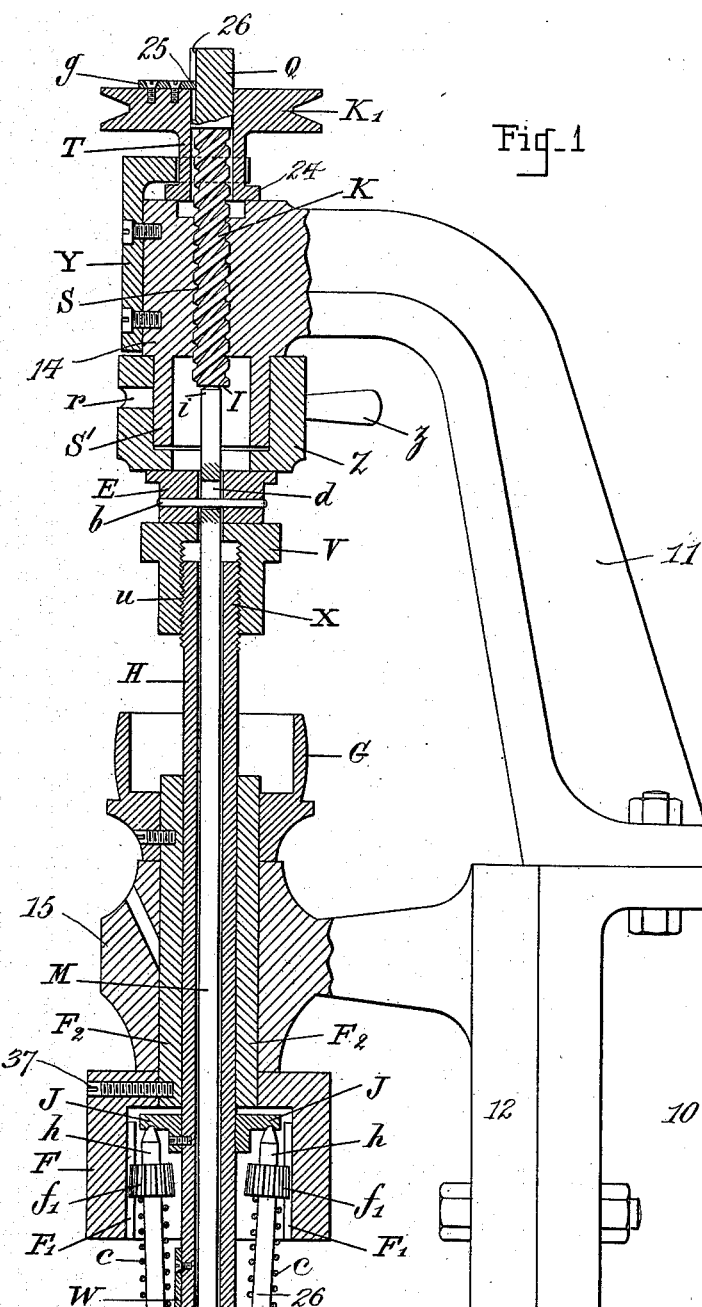

No. 714,727. Patented Dec. 2, 1902.
A. MASSON & E. FORTIN.
MACHINE FOR CUTTING BUTTONS, &c., OUT OF NACRE, &c.
(Application filed Jan. 11, 1902.)

(No Model.) 4 Sheets—Sheet 1.

Witnesses:
V. Cochue
George W. Colles

Alfred Masson & Edouard Fortin
Inventors

By Marion & Marion
Attorneys

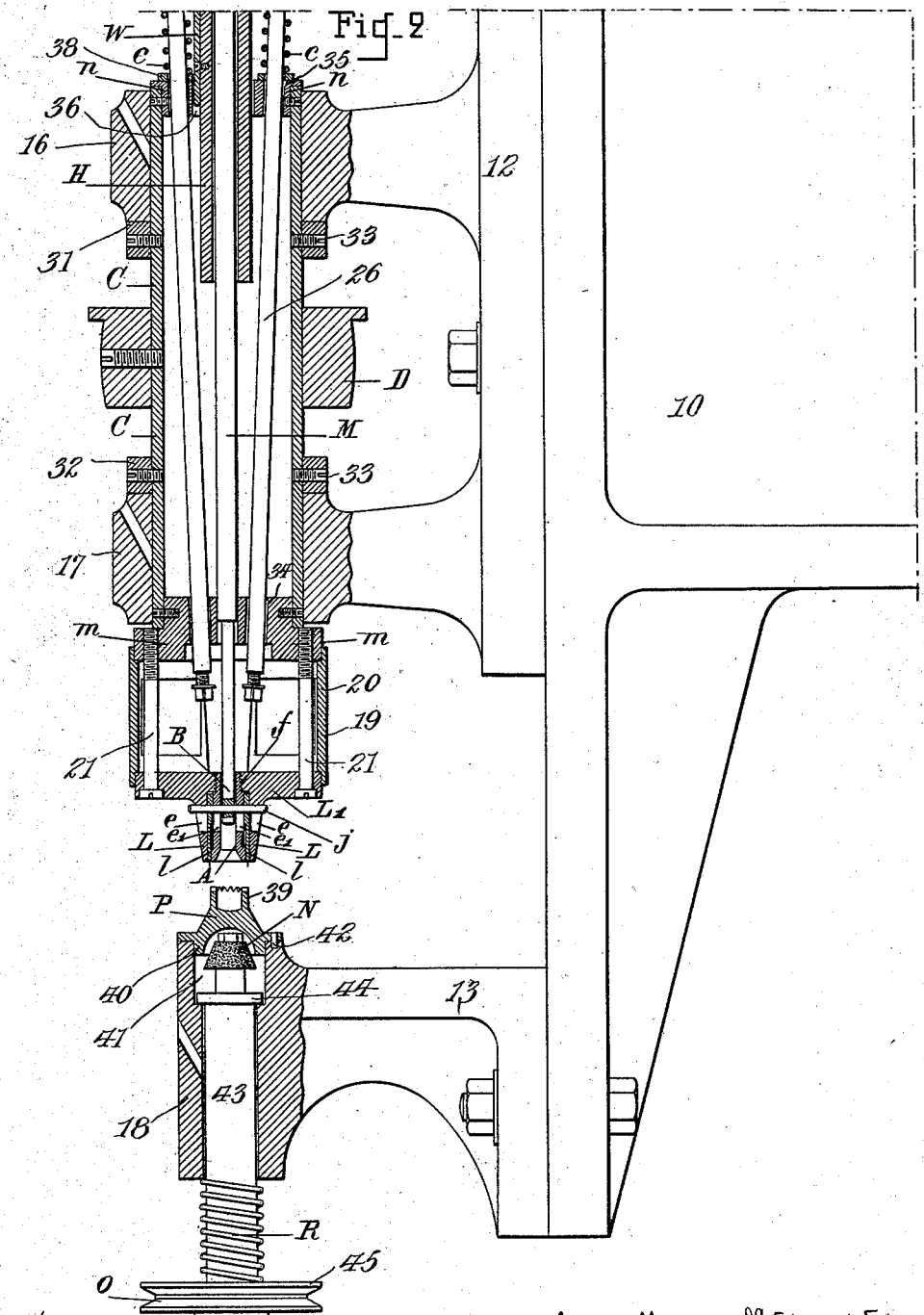

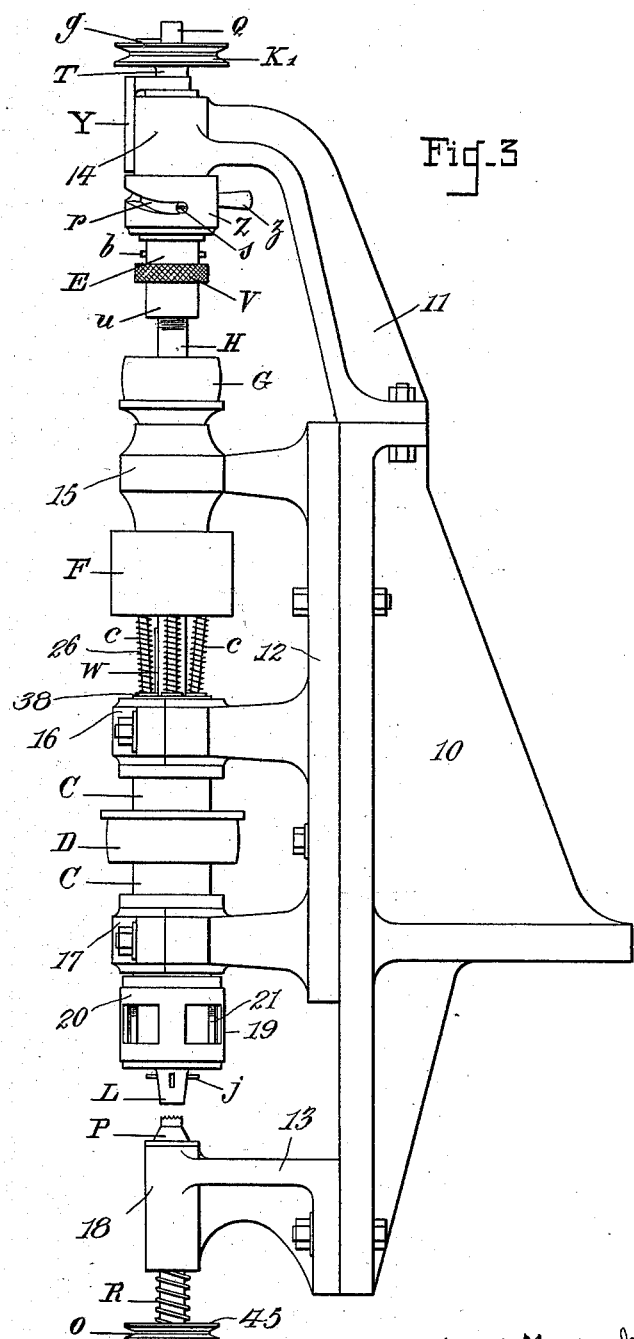

No. 714,727. Patented Dec. 2, 1902.
A. MASSON & E. FORTIN.
MACHINE FOR CUTTING BUTTONS, &c., OUT OF NACRE, &c.
(Application filed Jan. 11, 1902.)
(No Model.) 4 Sheets—Sheet 4.
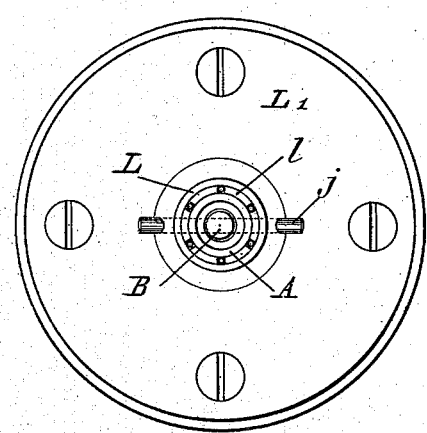
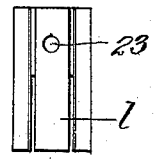
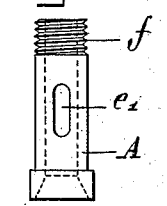
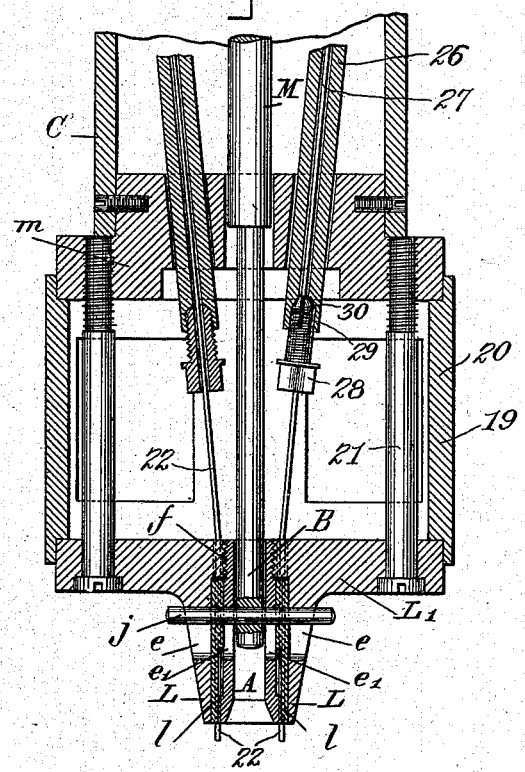
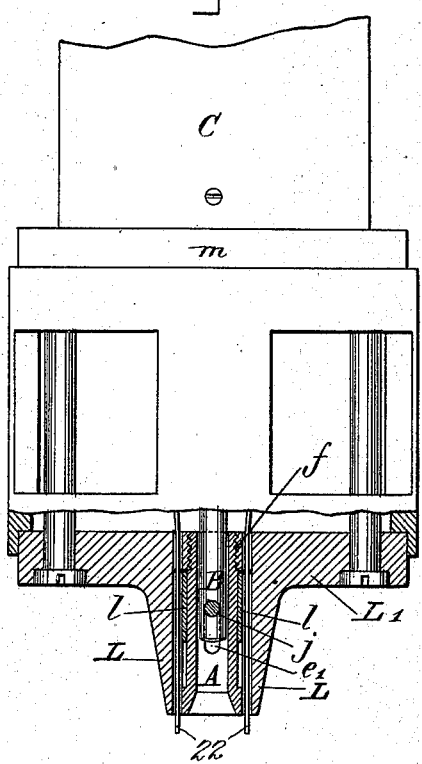
Witnesses:
V. Cochue
George W. Colles
Alfred MASSON & Edouard FORTIN,
Inventors
By Marion & Marion
Attorneys

UNITED STATES PATENT OFFICE.

ALFRED MASSON AND EDOUARD FORTIN, OF PARIS, FRANCE.

MACHINE FOR CUTTING BUTTONS, &c., OUT OF NACRE, &c.

SPECIFICATION forming part of Letters Patent No. 714,727, dated December 2, 1902.

Application filed January 11, 1902. Serial No. 89,367. (No model.)

*To all whom it may concern:*

Be it known that we, ALFRED MASSON and EDOUARD FORTIN, citizens of the Republic of France, residing in Paris, in the Republic of France, have invented a new and useful Machine for Cutting Hard Material, and Especially for Cutting Buttons Out of Nacre and the Like, (for which we have obtained a patent in France, No. 311,796, bearing date June 15, 1901,) of which the following is a specification.

Our invention relates to improvements in machines for cutting hard material, especially for cutting buttons out of nacre and the like. Heretofore such buttons were generally produced by means of a countersink or hollow cylinder of a diameter equal to that of the button to be produced, and this tool provided with bits on one side was adjusted with the other to the mandrel of the lathe, and then the tool described was pressed forward and made to act on the shell held by the operator of the machine. Under the pressure of the tool its bits bite into the material and cut out the blank which enters into the countersink. The blank is then withdrawn therefrom by means of a metallic wand, or else the countersink is mounted on a ring-piece having an excavation and arranged so that the finished button pushed by the next one is forced to drop through the excavation in question from the tool. Now it is plain that the piercing, the arrangement of the bits of the tool, the hardening, the adjustment or centering of the tool and the frequent sharpening of the same are operations requiring a skilled workman drilled by a long apprenticeship. On the other hand, the work of cutting the button in the manner described requires considerable strength and could scarcely be done but by men. It has, furthermore, the result to cause a notable elevation of the temperature of the blank as well as of the tool. These inconveniences are still aggravated by irregularities proceeding from the fact that each workman being in charge of the hardening and keeping of his tool it is not possible to obtain from the different workmen an equal minimum of waste susceptible of being determined beforehand, the cutting off of the crown of the piece constituting the waste being dependent on the depth of the tool arranged by the workman who handles it, and the importance of this inconvenience cannot be overlooked, as the cost of the raw material may be rather high, as in the case with nacre, which is in question here.

The object of our invention is to produce a machine whereby the said inconveniences are avoided. In order to attain this object, our machine is constructed so as to work without a countersink as a tool, the cutting being done by means of needles or ends of steel wire properly guided and varying in number with the size of the piece to be produced. The points of these needles are disposed so as to form a circle, and they execute a threefold movement—namely, of rotation, of translation, and of penetration. This is obtained by a system of broaches and gearings whereby they are pushed, as will be more fully explained later on. The sharpening of the needles takes place automatically. The crown of the blank to be cut out is obtained by the work of needles turning around their axes, and which instead of piercing the piece at the same place undergo a movement of translation whereby they are enabled to trace the circular furrow forming, when cut through, the outline of the button. It will be readily understood that this principle is susceptible of a great many applications, allowing to cut in form of a circle, of an arc, or of varying curved lines, to cut plates with parallel lines, to bore, and so on.

The machine of our invention is illustrated in the accompanying drawings, in which—

Figures 1 and 2 represent, respectively, the upper and lower half of the machine, the frame of which is shown in side elevation and the working parts in longitudinal central section. Fig. 3 is a side elevation of the complete apparatus on a smaller scale than Figs. 1 and 2. Fig. 4 is a longitudinal central section, on an enlarged scale, through the lower end of the working parts. Fig. 5 is a side elevation, partly in section, of the same parts as Fig. 4, but on a plane at right angles to the latter. Fig. 6 is a reverse plan view of the end of the work-shaft, as shown in Fig. 4; and Figs. 7 and 8 are side elevational views showing, respectively, the lantern-holding bolt and the lantern itself, which forms a guide for the needles.

The same characters of reference denote like parts in all the figures of the drawings.

The machine comprises a frame or workhead 10, having bracket-pieces 11, 12, and 13 bolted thereto, on which are formed in the same axial line the bearing-lugs 14, 15, 16, 17, and 18, the first four of which serve to support the rotating parts which operate the cutting-needles, while the lowest serves to support a rest for the work and for the grinding-tool, which is adapted to be applied to the needles to sharpen the same, as will be hereinafter described. The operating parts comprise a central arbor M, which is adapted to rotate and has connected therewith the needle-head 19, and surrounding it are a series of concentric sleeves H and F², the nature and functions of which will be described hereinafter.

The needle-head 19, which carries the needles, comprises a cylindrical body-piece 20, which is rabbeted at its ends for the reception of two blocks, (designated $m$ and L', respectively,) which are bolted together by bolts 21. The block L', which is at the lower side of the needle-head, carries a downwardly-projecting concentric nipple L, which is recessed in the center for the reception of the cylindrical piece $l$, (shown in detail in Fig. 8 and herein termed the "lantern,") this piece having around its walls longitudinal holes, bored in which reciprocate the chisel-pointed cutting-needles 22, whose lower ends are adapted to project slightly therethrough, as shown, during the cutting operation. This lantern $l$ has a longitudinal reciprocating movement in the nipple L and is held in place by a bolt A, (shown in Fig. 7,) which passes through its center and has screw-threads formed on its end, which engage with female threads $f$, formed on the interior of the bore of the block L', as shown. The interior of the lantern is likewise rabbeted, so as to coöperate with the head of the bolt A and permit the lantern $l$ to have a longitudinal motion, so as to project more or less from the nipple L, according as the work progresses. It will be understood that the function of the lantern $l$ is to hold the needles up to their work and guide them, at the same time preventing their bending. This lantern is operatively connected with the central shaft M by a cross-pin $j$, which passes through a transverse bar in the center of the lower end B of the shaft M and through similar apertures 23 in the sides of the lantern. In order to permit the reciprocative movement of this pin along with the arbor M and the lantern $l$, the nipple is formed with a pair of longitudinal slots $e$, and the bolt A is similarly formed with diametrical longitudinal slots $e'$. It will be observed that the bolt A is tubular to permit the reciprocation of the end B of the shaft M therein. From this construction it will be seen that the function of the shaft M is to give a feed or advance movement to the lantern $l$.

To provide for the feed movement of the lantern $l$ just described, there is arranged at the upper end of the machine, as shown in Fig. 1, a very steep-pitched screw-spindle K, which is operatively engaged in a corresponding screw-threaded socket formed by the female threads S on the interior of the lug 14. The lower end of this spindle is formed as a step-bearing to bear against the upper end $i$ of the arbor M and to press it downwardly when it is desired to advance the lantern. The upper end of the spindle K has a polygonal or other irregularly-shaped stud Q, which passes through the central opening of the pulley-sheave K', but has an extension T, provided with a flange 24 for holding it in place, which is done by means of a yoke Y, secured to the side of the lug 14. The sheave K' is thus freely rotatable in its bearings, but has no longitudinal movement. It is connected with the stud Q by a plate $g$, having a tongue 25, projecting into the groove 26 in the side of the stud Q, so as to operatively connect the spindle K with the sheave K', causing the former to be rotated by the latter, while at the same time the spindle has a longitudinal movement independent of the sheave. Therefore by rotating the sheave K', which may be done by a belt or other contrivance, the spindle is advanced in its socket, which advances the shaft M and the lantern carried by its lower end B. The return movement is effected by springs $c$, which are connected with the spindles of the needles in the manner hereinafter described, and by pushing upwardly upon the shaft M cause the spindle K to be backwardly rotated, this being possible by reason of the steep pitch of the spindle K.

We will next describe the means for advancing the needles themselves independently of the lantern. This is accomplished by means of the sleeve H, immediately surrounding the shaft M for the greater part of its length. This sleeve has a threaded end X, which engages with the internal thread $u$, formed in a recess in the lower side of the block V, which abuts in turn upon the block E, connected rotatively with the shaft M by a cross-pin $b$, passing through the slot $d$ in the shaft M, so that the block E is driven by the shaft M, while the latter has a longitudinal motion independent of the block E by reason of the slot $d$. The upper end of the block E has a thrust-bearing, which abuts against the lower bearing-face of the cam-block Z, which is swiveled upon the depending nipple S', formed on the lower end of the lug 14, and has in one side an oblique or inclined slot $r$, in which engages the pin $s$, secured in the side of the nipple S'. The cam-block Z is operated by a radial handle $z$, projecting from the side, so that as the handle $z$ is rotated the cam-block will be advanced by reason of the oblique slot $r$, and thus in turn will advance the block E, and thereby the block V and the sleeve H. The latter has firmly fixed to it at an intermediate point of its length a bearing-plate J, as shown, on the lower side of which are formed step-bearings for the support of the upper ends of the needle-bars 26, which are arranged at regular intervals around the central shaft M, as shown, and have pivots $h$ at their upper ends engaging with the step-bearings in the plate J. The lower ends of these needle-bars are centrally bored, as shown at 27, for the reception of the ends of the needles 22, which project inwardly thereinto, so as to enable these needles to be adjusted in position according as their boring ends become worn out. These needles are firmly and adjustably clamped in position in the needle-bars 26 by means of any suitable tubular clamping-screws 28, which engage in threaded sockets 29 in the lower ends of the needle-bars, and have their ends slit, as shown at 30, and formed conical, so as to be jammed against the needles to firmly clamp the same. It will be observed that the needle-bars 26 by reason of their size are necessarily somewhat obliquely positioned with relation to the axes of the needles; but the slight curvature caused in the needles thereby is insufficient to strain them beyond the elastic limit. As the upper ends of the needle-bars abut against the plate J, the advancement of the sleeve H causes the needle-bars, and hence the needles, to be advanced with relation to the lantern $l$ and the parts in which they turn.

We will next describe the mechanism which supports the needles and needle-heads and gives them their motion of translation in a circle, whereby the circular channel is cut in the shell or other object from which the round blank is formed. Journaled in the two lugs 16 and 17 and between the latter is a spindle-head C, which is in the form of a hollow cylinder having thrust-collars 31 and 32 secured thereto by screws 33 in position to bear against the lower face of the lug 16 and the upper face of the lug 17, respectively, so that the spindle-head is retained against longitudinal motion. To the lower end of this spindle-head is secured the block $m$, which has a nipple projecting thereinto, and to the upper end is secured another block $n$, both of these blocks being centrally bored to provide for the passage of the shaft M and also having a series of surrounding bearing-apertures, (designated, respectively, 34 and 35,) through which pass and in which are journaled the needle-bars 26. Surrounding the spindle-head and secured thereto is a pulley D, and inasmuch as the cutting-head 19 is secured to the block $m$ it will be seen that the rotation of the pulley D will cause a simultaneous rotation of the whole of the cutting-head, needle-bars, lantern, and all the parts connected therewith. As it is also necessary to provide for the rotation of the plate J and the sleeve H, to which it is connected, the latter is provided with a spline W, secured to one side and operating in a keyway 36 on the interior of the aperture in the block $n$, through which the sleeve H passes. In this manner it will be seen that the rotation of the spindle-head serves also to rotate the sleeve H, and thereby by means of transverse pins $b$ and $j$ to rotate the shaft M therewith.

To provide for the rotation of each of the needles 22 about their individual axes simultaneously with their motion of translation in a circle about the axis of the machine, we provide an annular gear-block F, which is secured by a screw 37 to the sleeve $F^2$, journaled in the lug 15 and having secured to its upper end the pulley G. The block has formed on its inner side teeth $F'$, with which engage the pinions $f'$, formed on the upper end of the needle-bars 26. The annular gear-block F is formed with a very wide internal face, so as to permit the longitudinal movement of the needle-bars necessary to advance the needles without disengaging the pinions $f'$ from the teeth $F'$. It will be seen that the independent rotation of the pulleys G and D at different rates of speed will therefore cause an epicyclic rotation of the pinions $f'$, and hence of the needles upon their own axes, and to greatly increase the speed of said epicyclic rotation the two pulleys D and G may be rotated in opposite directions.

In order to provide for supporting the weight of the sleeve H and the parts resting thereon and for raising the needles and lantern when it is desired to withdraw the same from the work, we provide the springs $c$, which surround the upper ends of the needle-bars 26 and abut, respectively, against the lower sides of the pinions $f'$ and against washers 38, which rest on the block $n$, surrounding the apertures through which the needle-bars pass. When the pulley K' is released, the upward pressure of the springs $c$ will cause the sleeve H to be raised and by consequence the shaft M. After the ends of the needles have been withdrawn into the lantern and the pin $b$ raised against the upper end of the slot $d$ the pressure of the upper end $i$ of the shaft M against the step-bearing I will cause the screw-spindle K to be raised, which is permitted by reason of its steep pitch.

During the operation of cutting a button-blank the shell from which it is cut rests on the cutting-block P, which is supported on the upper end of the lug 18 and has a projecting nipple 39, whose upper edge is serrated to prevent the work from turning. This block P rests loosely on the top of the lug 18, being held in position thereon by the engagement of a depending flange 40 with the inner surface of the recess 41, formed in the upper end of the lug, and by a pin 42, which connects the block P with the lug 18 to prevent it from rotating, so that the block P may be readily lifted out.

As a very useful attachment to our apparatus we prefer to provide an automatic means for sharpening the chisel-edges which are formed on the lower points of the needles, this being shown in Fig. 2, and it is in the form of a conical grinding-wheel N, mounted on the spindle 43, which is journaled in the lug 18, immediately below the rest-block P. The spindle 43 has a thrust-collar 44, which rests on the lower edge of the recess 41, and its lower end projects below the lug 18 and carries a pulley-sheave 45, by the revolution of which the grinding-wheel is rotated. The spring R surrounds the spindle 43 and holds the latter loosely in its lowest position; but it is arranged to be raised by any suitable means, such as a hand-lever, whenever the needle-points are to be ground. During this operation the needles are projected downwardly to the desired extent, the block P being removed and the spindle 43 projected until the grinding-wheel N comes in contact with the edged points of the needles and sharpens the latter. In order to provide for accurately sharpening the edges of the needles on their opposite sides, it is to be observed that the positions of the spindle-head C and of the annular gear F must bear definite relations to each other. It is preferable to form the pinions $f'$ with such a number of teeth as shall be an aliquot part of the number of teeth F', so that by rotating the needle-bars and annular gear relatively through a definite fraction of a revolution all of the needles will be turned with their edges in line with the circumference of the circle in which they move. Thus, for instance, suppose the annular gear F is formed with seventy-two teeth, the small pinions $f'$ may have twelve teeth each, so that at each one-sixth of a revolution of the spindle-head relatively to the annular gear the edges of the needles shall be in line with the circumference of the circle forming their circular path. This point should be marked by six notches, formed oppposite each other on the sleeves H and $F^2$, so that whenever these notches register with one another the edges of the needles will be in position for grinding. By then turning the sleeves H and $F^2$ relatively to one another until the notches on one are midway between the notches on the other the needles will have been rotated about their own axes one-half revolution, so that they will be again in line with the circumference of their path, but will present the opposite sides of their chisel-edges to the action of the grinding-wheel. It is only necessary, therefore, in operating the grinding-wheel to first set the needles so as to present one side to the action thereof, and subsequently the other side, in the manner mentioned.

The object of the screw-threaded block V, which connects with the sleeve H, is to enable the needles to be projected downwardly independently of the cam-block Z without adjusting the needles 22 in the needle-bars. By this means we are enabled to project the needle-bars as far as possible downwardly toward the lantern, and thus the needles may still serve when the shafts have already become very short by wear, and it is also possible by this arrangement to adjust the exact position of the ends of the needles during working.

While we have shown in the accompanying drawings the preferred form of our invention, it will be understood that we do not limit ourselves to the precise form shown, for many of the details may be changed in form or position without affecting the operativeness or utility of our invention, and we therefore reserve the right to make all such modifications as are included within the scope of the following claims or of mechanical equivalents to the structures set forth.

Having thus described our invention, what we claim as new, and desire to secure by Letters Patent, is—

1. A machine for cutting blanks from hard material comprising a crown of cutting-needles, means for rotating said needles independently each about its own axis, means for rotating the crown in a circular path, and means for independently giving said needles an advance movement to penetrate the work.

2. A machine for cutting blanks from hard material comprising a series of cutting-needles arranged in the form of a crown around a central axis, a series of needle-bars to which said needles are secured, a rotatable spindle-head in which said needle-bars are carried, and means for moving said needle-bars longitudinally through said spindle-head to advance said needles, substantially as described.

3. A machine for cutting blanks from hard material comprising a series of cutting-needles arranged in the form of a crown around a central axis, a series of needle-bars to which said needles are secured, a spindle-head in which said needle-bars are carried, and means for moving said needle-bars longitudinally through said spindle-head to advance said needles, in combination with a grinding device comprising a wheel mounted coaxially with said crown, and means for revolving and projecting said wheel, whereby to form chisel-edges on the points of said needles.

4. A machine for cutting round blanks from hard materials comprising a central shaft, a lantern carried on the lower end of said shaft, means for giving said shaft a longitudinal movement, a series of needles journaled in said lantern, means for independently advancing and retracting said needles, and a spindle-head in which said needles and shaft are mounted and adapted to rotate said needles.

5. A machine for cutting round blanks from hard material comprising a central shaft M having longitudinal motion, a cutting-head in which said shaft is mounted, a spindle-head adapted to rotate said cutting-head, a lantern reciprocably mounted in the lower end of said cutting-head, a cross-pin passing through the lower end of said shaft M and said lantern and connecting them together and passing through slots in the lower end of the cutting-head, whereby they are given a rotating movement thereby but permitted longitudinal movement therein, a series of needles journaled in longitudinal apertures in the walls of said lantern, means for independently rotating said needles each about its own axis, and means for rotating the spindle-head to carry the needles as a whole in a circular path, substantially as described.

6. A machine for cutting round blanks from hard materials comprising a central shaft M having longitudinal motion, a cutting-head in which said shaft is mounted, a spindle-head adapted to rotate said cutting-head, a lantern reciprocably mounted in the lower end of said cutting-head, a cross-pin passing through the lower end of said shaft M and said lantern and connecting them together and passing through slots in the lower end of the cutting-head, whereby they are given a rotating movement thereby but permitted longitudinal movement therein, a series of needles journaled in longitudinal apertures in the walls of said lantern, means for independently rotating said needles each about its own axis, and means for rotating the spindle-head to carry the needles as a whole in a circular path, in combination with a removable work-rest opposite the lower end of said shaft, a spindle 43 journaled in the frame below said work-rest, a grinding-wheel carried by the upper end of said spindle, means for rotating said spindle and means for projecting said spindle upwardly to bring said grinding-wheel against said needles, substantially as described.

7. A machine for cutting round blanks from hard material comprising a central shaft carrying a guide at its operative end, a series of needles arranged in crown form about said shaft and operating in said guide, means for advancing said shaft longitudinally, a sleeve H surrounding said shaft, a plate J secured to said sleeve for the ends of said needles, means for advancing said sleeve to advance the needles independently of the guide, and means for rotating as a whole all the said elements.

8. A machine for cutting round blanks from hard material comprising a central shaft carrying a guide at its operative end, a series of needles arranged in crown form about said shaft and operating in said guide, means for advancing said shaft longitudinally, a sleeve H surrounding said shaft, a plate J secured to said sleeve for the ends of said needles, means for advancing said sleeve to advance the needles independently of the guide, means for rotating as a whole all of said elements, and means for independently rotating said needles.

9. A machine for cutting round blanks from hard material comprising a central shaft carrying a guide at its operative end, a series of needles arranged in crown form about said shaft and operating in said guide, means for advancing said shaft longitudinally, a sleeve H surrounding said shaft, a plate J secured to said sleeve for the ends of said needles, means for advancing said sleeve to advance the needles independently of the guide, means for rotating as a whole all of said elements, a second sleeve surrounding said first-mentioned sleeve and rotatably journaled on the frame, an annular gear mounted on one end of said sleeve and surrounding the upper ends of the needles, pinions fixed to the individual needles and engaging with said annular gear, and a spindle-head in which all of the rotative parts are journaled, whereby the independent rotation of said spindle-head and said annular gear causes the needles to have an independent rotation each about its own axis simultaneous with the movement of translation in a circular path.

10. A machine for cutting round blanks from hard material comprising a central shaft carrying a guide at its lower end, means for advancing said shaft, a series of needles arranged in the form of a crown around said shaft and journaled in said guide, a series of bars in which said needles are axially mounted, a spindle-head in which said needle-bars are rotatably mounted and surrounding said central shaft, means for rotating said needle-bars individually, and a sleeve surrounding said central shaft and connected with said needle-bars by a thrust-bearing, said sleeve being longitudinally reciprocable to advance said needles.

11. A machine for cutting round blanks from hard material comprising a central shaft carrying a guide on its lower end, means for advancing said shaft, a series of needles arranged in the form of a crown around said shaft and journaled in said guide, a series of needle-bars in which said needles are axially mounted, a spindle-head in which said needle-bars are rotatably mounted, means for rotating said needle-bars individually, a sleeve surrounding said central shaft and rotatably keyed to said spindle-head so as to have a longitudinal motion relative thereto, a thrust-bearing plate secured to said sleeve and against which said needle-bars rest, a cam-block having an oblique groove mounted in the head of the machine against which the upper end of said sleeve bears, and a pin projecting through the groove in said cam-block, whereby the rotation of said cam-block causes said sleeve and the needles to be advanced.

12. A machine for cutting round blanks from hard material comprising a central shaft carrying a guide at its lower end, means for advancing said shaft, a series of needles arranged in the form of a crown around said shaft and journaled in said guide, a series of needle-bars in which said needles are axially mounted, a spindle-head in which said needle-bars are rotatably mounted and surrounding said central shaft, means for rotating said needle-bars individually, a sleeve surrounding said central shaft and rotatably keyed to said spindle-head so as to have a longitudinal motion relative thereto, a thrust-bearing plate secured to said sleeve and against which said needle-bars rest, a cam-block having an oblique groove mounted in the head of the machine against which the upper end of said sleeve bears, a pin projecting through the groove in said cam-block whereby the rotation of said cam-block causes said sleeve and the needles to be advanced, and an intermediate block V having a threaded connection with the end of the sleeve, whereby the longitudinal position of the latter may be adjusted independently of said cam-block.

13. A machine for cutting round blanks from hard material comprising a central shaft carrying a guide at its lower end, means for advancing said shaft, a series of needles arranged in the form of a crown around said shaft and journaled in the said guide, a series of needle-bars in which said needles are axially mounted, a spindle-head in which said needle-bars are rotatably mounted and surrounding said central shaft, means for rotating said needle-bars individually, a sleeve surrounding said central shaft and rotatably keyed to said spindle-head so as to have a longitudinal motion relative thereto, a thrust-bearing plate secured to said sleeve and against which said needle-bars rest, a cam-block having an oblique groove mounted in the head of the machine and against which the upper end of said sleeve bears, a pin projecting through the groove in said cam-block, whereby the rotation of said cam-block causes said sleeve and the needles to be advanced, an intermediate block V having a threaded connection with the end of the sleeve, whereby the longitudinal position of the latter may be adjusted independently of said cam-block, an independent block E between the block V and the cam-block and a cross-pin b secured to said block E and passing through a slot in said central shaft, whereby to cause the same to be rotated while permitting independent longitudinal movement thereof.

14. A machine for cutting round blanks from hard material comprising a central shaft carrying a guide at its lower end, means for advancing said shaft, a series of needles arranged in the form of a crown around said shaft and journaled in said guide, a series of needle-bars in which said needles are axially mounted, a spindle-head in which said needle-bars are rotatably mounted and surrounding said central shaft, means for rotating said needle-bars individually, a sleeve surrounding said central shaft and rotatably keyed to said spindle-head so as to have a longitudinal motion relative thereto, a thrust-bearing plate secured to said sleeve and against which said needle-bars rest, a cam-block having an oblique groove mounted in the head of the machine and against which the upper end of said sleeve bears, a pin projecting through the groove in said cam-block, whereby the rotation of said cam-block causes said sleeve and the needles to be advanced, a screw-spindle of steep pitch mounted in the head of the machine opposite the end of said central shaft and having a step against which the end of said shaft bears, means for rotating said spindle to cause the advancement of said shaft, and a series of springs tending to raise the needles and parts which depress them, whereby to withdraw them from their work, substantially as described.

In witness whereof we have hereunto set our hands in the presence of two witnesses.

ALFRED MASSON.
EDOUARD FORTIN.

Witnesses:
EDWARD P. MACLEAN,
JULES FAYOLLET.